US012455508B2

(12) United States Patent
Yu et al.

(10) Patent No.: US 12,455,508 B2
(45) Date of Patent: Oct. 28, 2025

(54) NANOLITHOGRAPHY USING PULSED LASER DIRECT WRITING

(71) Applicant: University of Central Florida Research Foundation, Inc., Orlando, FL (US)

(72) Inventors: Xiaoming Yu, Orlando, FL (US); Boyang Zhou, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 353 days.

(21) Appl. No.: 18/106,338

(22) Filed: Feb. 6, 2023

(65) Prior Publication Data

US 2023/0251577 A1 Aug. 10, 2023

Related U.S. Application Data

(60) Provisional application No. 63/306,690, filed on Feb. 4, 2022.

(51) Int. Cl.
*G03F 7/00* (2006.01)
(52) U.S. Cl.
CPC ................. *G03F 7/70025* (2013.01)
(58) Field of Classification Search
CPC .................................................. G03F 7/70025
See application file for complete search history.

(56) References Cited

U.S. PATENT DOCUMENTS

| 2011/0240617 | A1* | 10/2011 | Xu | ............ | B23K 26/38 |
| | | | | | 219/121.72 |
| 2013/0077073 | A1* | 3/2013 | Van Schoot | ...... | H05G 2/0088 |
| | | | | | 355/67 |
| 2022/0380602 | A1* | 12/2022 | Oran | .......... | B82Y 40/00 |

OTHER PUBLICATIONS

Bonse, Jorn et al., Laser-Inducted Periodic Surface Structures—A Scientific Evergreen; IEEE Journal of Selected Topics in Quantum Electronics, vol. 23, No. 3, May/Jun. 2017.
Chowdhury, Ihtesham H. et al., "Ultrafast pulse train micromachining," Proc. SPIE 4978, Commercial and Biomedical Applications of Ultrafast Lasers III (Jun. 19, 2003).
Englert, L. et al., "Control of ionization processes in high band gap materials via tailored femtosecond pulses,"; Optical Society of America, Dec. 14, 2007.

(Continued)

*Primary Examiner* — Nicole M Ippolito
(74) *Attorney, Agent, or Firm* — Suiter Swantz IP

(57) ABSTRACT

A laser patterning method may include fabricating one or more precursor sites on a sample, generating an illumination beam including one or more pulse bursts, each pulse burst including two or more laser pulses, and scanning the illumination beam across the sample along a scan pattern including locations of the one or more precursor sites. At least one of intensities, temporal inter-pulse spacings, or spatial overlap between the two or more laser pulses in the illumination beam may be selected to selectively excite the one or more precursor sites to selectively modify the sample at the one or more precursor sites to form one or more patterned features, where a dimension of at least one feature in the one or more patterned features along at least one dimension is smaller than a size of the illumination beam on the sample.

31 Claims, 7 Drawing Sheets

(56) References Cited

OTHER PUBLICATIONS

Englert, L. et al., "Material processing of dielectrics with temporally asymmetric shaped femtosecond laser pulses on the nanometer scale," Appl Phys A (2008) 92: 749-753.

Englert, L. et al., "Morphology of nanoscale structures on fused silica surfaces from interaction with temporally tailored femtosecond pulses,"; Journal of Laser Applications 24, 042002 (2012).

Gamaly, E.G.C, The physics of ultra-short laser interaction with solids at non-relativistic intensities; Elsevier, Physics Reports 508 (Jul. 20, 2011) 91-243.

Garcia-Lechuga, et al., "Evidencing the nonlinearity independence of resolution in femtosecond laser ablation," Optics Letters, vol. 45, No. 4, Feb. 15, 2020.

Gattass, Rafael R. et.al., "Femtosecond laser micromachining in transparent materials," Nature Photonics, Nature Publishing Group, vol. 2, Apr. 2008.

Giglio, Marzio et al., "Near-field intensity correlations of scattered light,", Applied Optics, vol. 40, No. 24, Aug. 20, 2001.

Giglio, Marzio et al., Space Intensity Correlations in the Near Field of the Scattered Light: A Direct Measurement of the Density Correlation Function g(r); The American Physical Society, Physical Review Letters, vol. 85, No. 7, Aug. 14, 2000.

Grojo, D. et.al., "Exciton-seeded multiphoton ionization in bulk SiO2,", The American Physical Society, Physical Review B 81, 212301 (2010).

Hohm, S. et al., "Femtosecond laser-induced periodic surface structures on silica,"; J. Appl. Phys. 112, 014901 (2012).

Joglekar, Ajit P., et al., "Optics at critical intensity: Applications to nanomorphing," PNAS vol. 101, No. 16, pp. 5856-5861, Apr. 20, 2004.

Kun Du, et al., "Controllable photon energy deposition efficiency in laser processing of fused silica by temporally shaped femtosecond pulse: Experimental and theoretical study,"; Elsevier, Optics and Laser Technology 128 (2020) 106265.

Ming Li et al., "Ultrafast Electron Dynamics in Femtosecond Optical Breakdown of Dielectrics,"., The American Physical Society, Physical Reviews Letters, vol. 82, No. 11, Mar. 15, 1999.

Mouskeftaras, Alexandros, et al., "Direct measurement of ambipolar diffiusion in bulk silicon by ultrafast infrared imaging of laser-induced microplasmas,", Applied Physics Letters 108, 041107 (2016).

Pronko, P.P., et al., "Machining of sub-micron holes using a femtosecond laser at 800 nm," Elsevier, Optics Communications 114 (Jan. 15, 1995) 106-110.

Siders, Craig W. et al., "Efficient high-energy pulse-train generation using a 2n-pulse Michelson interferometer,"; Appl. Optics, vol. 37, No. 22, Aug. 1, 1998.

Skuja, et al., "Laser-induced color centers in silica,"; Proc. SPIE 4347, Laser-Induced Damage in Optical Materials: 2000, Apr. 12, 2001.

Stuart, B.C., et al., "Nanosecond-to-femtosecond laser-induced breakdown in dielectrics,"; The American Physical Society, Physical Review B, vol. 53, No. 4, Jan. 15, 1996—II.

Wang, et al., "Femtosecond pulse laser ablation of sapphire in ambient air,"; Elsevier, Applied Surface Science 228 (2004) 221-226.

Weiner, A.M. "Femtosecond Optical Pulse Shaping and Processing," Prog. Quant. Electr. 1995, vol. 19, pp. 161-237.

Yang Liao, et al., "Direct laser writing of sub-50 nm nanofluidic channels buried in glass for three-dimensional micro-nanofluidic integration,"; RSC Publishing, Lab Chip, 2013, 13, 1626 (2013).

Zhou, Boyang et al., "Generating bursts of femtosecond laser pulses with a tunable delay and envelope in a folded Michelson interferometer,"; Applied Optics, vol. 60, No. 20, Jul. 10, 2021.

Zhou, Boyang et al., "Invariance of the r 2-In(F) relationship and attainable precision in ultrafast laser ablation experiments,"; Optics Express, vol. 29, No. 4, Feb. 15, 2021.

Zhou, Boyang et al., "Reducing feature size in femtosecond laser ablation of fused silica by exciton-seeded photoionization,"; Optics Letters, vol. 45, No. 7, Apr. 1, 2020.

\* cited by examiner

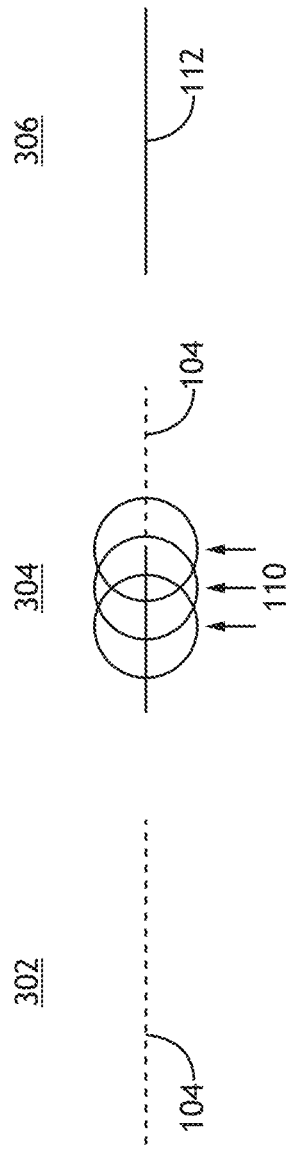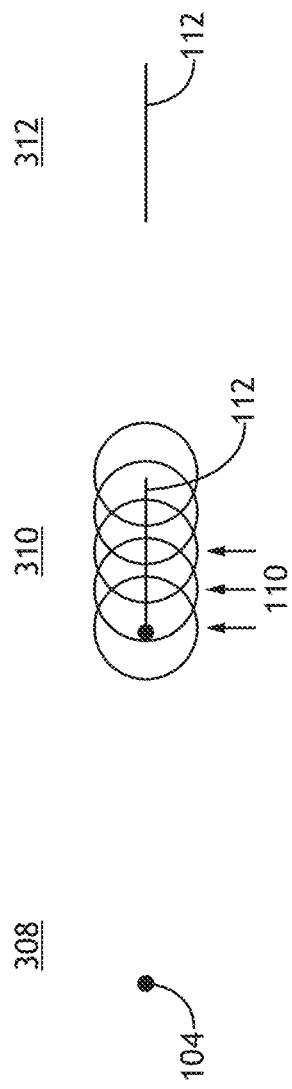

NANOLITHOGRAPHY USING PULSED LASER DIRECT WRITING

CROSS-REFERENCE TO RELATED APPLICATION

The present application claims the benefit under 35 U.S.C. § 119(e) of U.S. Provisional Application Ser. No. 63/306,690, filed Feb. 4, 2022, entitled NANOLITHOGRAPHY USING PULSED LASER DIRECT WRITING naming Xiaoming Yu and Boyang Zhou as inventors, which is incorporated herein by reference in the entirety.

GOVERNMENT LICENSE RIGHTS

This invention was made with Government support under contract 1846671 awarded by the National Science Foundation (NSF). The government has certain rights in the invention.

TECHNICAL FIELD

The present disclosure generally relates to nano-scale patterning and, more particularly, to nano-scale patterning with pulsed lasers.

BACKGROUND

Ultrashort laser pulses (e.g., laser pulses with durations on the order of picoseconds, femtoseconds, or lower) can produce nanometer-scale structures with high resolution due to so-called "cold ablation" that reduces or completely avoids detrimental thermal effects. However, stochastic effects typically limit the feature size and/or repeatability of the patterning process. For example, relatively small feature sizes may be achieved using tightly-focused laser beams and by adjusting the deposited laser energy to be slightly above the damage or modification threshold, at least in a central portion of the focused beam profile. However, this thresholding technique has poor repeatability because it depends on near-threshold processes which are stochastic in nature. As another example, nano-scale features may be fabricated in some applications through multi-photon absorption in large-bandgap materials. However, fluctuations in the laser energy may offset the benefits of the large bandgap such that sub-100 nm structures cannot be fabricated reproducibly. There is therefore a need to develop systems and methods for repeatable nano-scale patterning that cure the above shortcomings.

SUMMARY

A laser patterning method is disclosed, in accordance with one or more embodiments of the present disclosure. In one embodiment, the laser patterning method includes fabricating one or more precursor sites on a sample. In another embodiment, the laser patterning method includes generating an illumination beam including one or more pulse bursts, each pulse burst including two or more laser pulses. In another embodiment, the laser patterning method includes scanning the illumination beam across the sample along a scan pattern including locations of the one or more precursor sites, wherein the illumination beam includes one or more pulse bursts, wherein each pulse burst includes two or more laser pulses, wherein at least one of intensities, temporal inter-pulse spacings ($\Delta t$), or spatial overlap between the two or more laser pulses in the illumination beam are selected to selectively excite the one or more precursor sites to selectively modify the sample at the one or more precursor sites to form one or more patterned features, wherein a dimension of at least one feature in the one or more patterned features along at least one dimension is smaller than a size of the illumination beam on the sample.

A laser patterning system is disclosed, in accordance with one or more embodiments of the present disclosure. In one embodiment, the laser patterning system includes a laser source configured to generate one or more input laser pulses. In another embodiment, the laser patterning system includes a burst generator including one or more optical elements to generate an illumination beam including one or more pulse bursts from at least one of the one or more input laser pulses from the laser source, wherein each pulse burst includes two or more laser pulses. In another embodiment, the laser patterning system includes a scanning system to induce a relative motion between the illumination beam and a sample to provide a scan pattern of the illumination beam across the sample, wherein the sample includes one or more precursor sites, wherein the scan pattern covers the one or more precursor sites. In another embodiment, at least one of intensities, temporal inter-pulse spacings, or spatial overlap between the two or more laser pulses in the illumination beam from the burst generator and the scanning system are selected to selectively excite the precursor sites to selectively modify the sample at the one or more precursor sites to form one or more patterned features, wherein a dimension of at least one feature in the one or more patterned features along at least one dimension is smaller than a size of the illumination beam on the sample.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3A is an illustration depicting selective modification of a sample to form patterned features at locations associated with one or more precursor sites, in accordance with one or more embodiments of the present disclosure.

FIG. 3B is an illustration depicting both expansion of a precursor site along a selected direction as an expanded precursor site and selective modification of the expanded precursor site, in accordance with one or more embodiments of the present disclosure.

DETAILED DESCRIPTION

Figure 1:
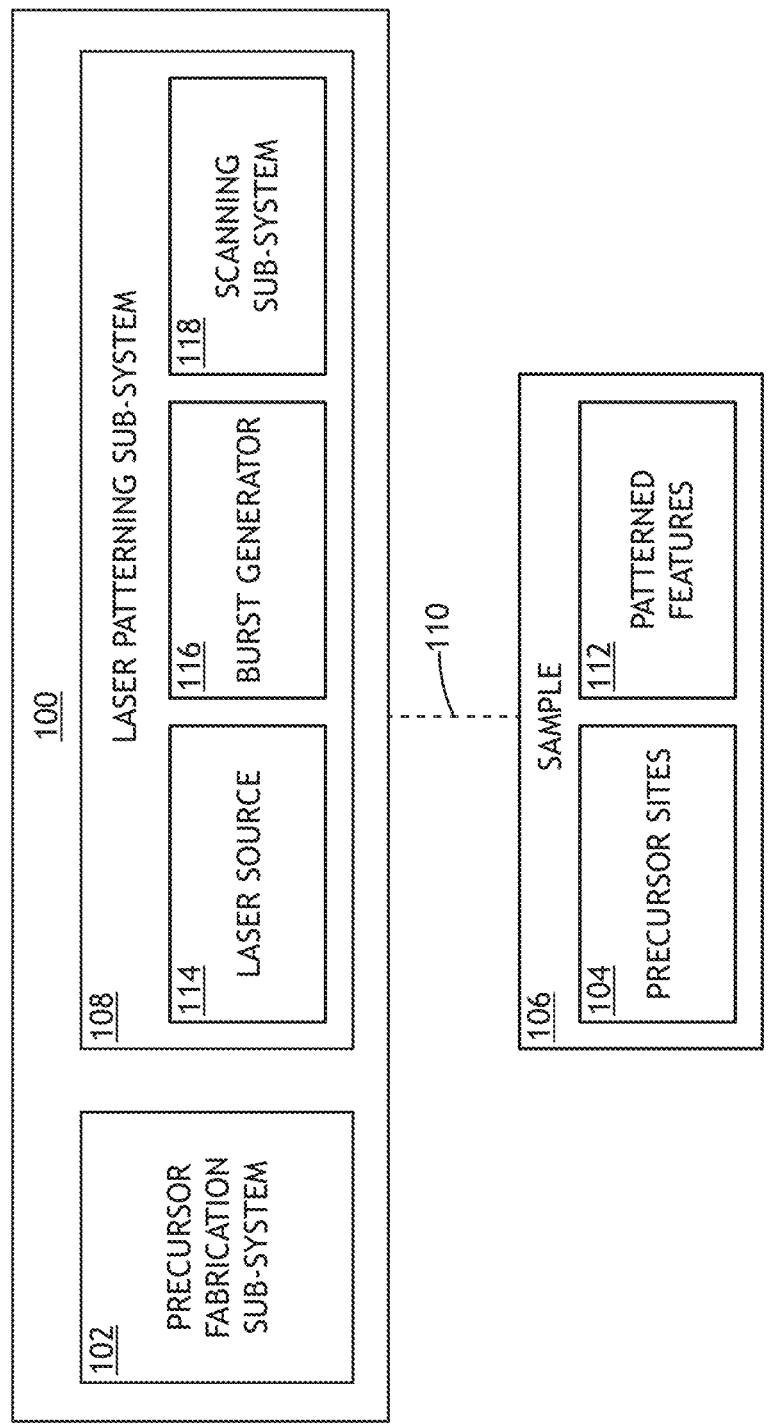
FIG. 1 is a block diagram of a system for sample patterning, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for laser patterning using bursts of laser pulses tailored to selectively excite precursor sites on a sample without inducing damage or material modifications on the remainder of the sample. For example, an illumination beam may include one or more bursts of laser pulses (e.g., pulse bursts), where properties of the illumination beam such as, but not limited to, intensities of each constituent pulse, inter-pulse temporal spacings between pulses in a burst, or inter-burst spacings between bursts are tailored to avoid modification of the sample generally but successively excite precursor sites on the sample to induce modification at locations of the precursor sites. As an illustration, the laser pulses within a pulse burst may excite carriers in the precursor sites to intermediate energy levels or excitation states that are lower than a bandgap or modification threshold of the surrounding material. Further, the inter-pulse spacings may be tuned to be smaller than the lifetimes of such intermediate excitation states such that the sequence of pulses in the pulse burst may successively re-excite these carriers and generate a critical density of carriers sufficient to induce modification of the sample localized to the locations of the precursor sites.

It is contemplated herein that the laser patterning method disclosed herein may enable the fabrication of features having dimensions substantially smaller than a beam diameter of the illumination beam on the sample. In particular, by selectively exciting the precursor sites rather than the surrounding material in the sample, the dimensions of fabricated features may be based on the dimensions of the precursor pattern rather than a focused beam profile of the illumination beam. In some embodiments, the systems and methods disclosed herein enable the fabrication of features on the order of nanometers (e.g., 100 nm, 50 nm, or less).

In some embodiments, a laser patterning method includes forming precursor sites in a precursor pattern on the sample and illuminating the sample with an illumination beam formed from a one or more pulse bursts tailored to selectively induce material modification along the precursor pattern.

In some embodiments, a laser patterning method includes forming an initial precursor site and illuminating the sample with an illumination beam formed from one or more pulse bursts, where pulses within the illumination beam are arranged both temporally and spatially to both induce modification of the sample along the precursor pattern and to expand the precursor site along at least one selected direction. For example, scanning the illumination beam along a path may both progressively expand a precursor site along the path and selectively induce modification of the sample along the path with dimensions of the precursor site. More generally, this technique may enable direct writing of an arbitrary pattern with feature sizes smaller than the beam size.

It is further contemplated that the systems and methods disclosed herein may enable repeatable and reliable feature fabrication. For example, laser patterning techniques using ultrashort pulses (e.g., pulses having durations on the order of picoseconds or less) typically suffer from unreliable and/or unrepeatable fabrication results due to reliance on stochastic or thresholding phenomena. However, the systems and methods disclosed herein based on selective excitation of precursor sites in a desired pattern may overcome such shortcomings and enable reliable and repeatable fabrication of features with nanoscale precision.

Referring now to FIGS. 1-7, systems and methods for laser patterning are described, in accordance with one or more embodiments of the present disclosure.

FIG. 1 is a block diagram of a system 100 for sample patterning, in accordance with one or more embodiments of the present disclosure. In some embodiments, the system 100 includes a precursor fabrication sub-system 102 configured to fabricate one or more precursor sites 104 on a sample 106. In some embodiments, the system 100 includes a laser patterning sub-system 108 configured to generate an illumination beam 110 including one or more pulse bursts (e.g., bursts of laser pulses) and scan the illumination beam 110 across at least a portion of the sample 106 that includes the precursor sites 104.

Figure 2:
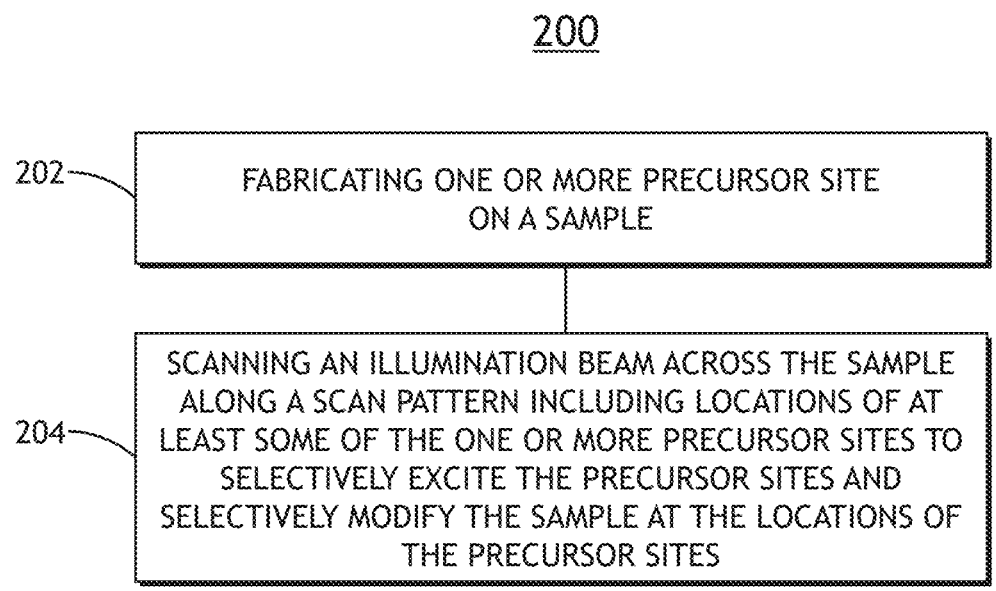
FIG. 2 is a flow diagram illustrating steps performed in a laser patterning method, in accordance with one or more embodiments of the present disclosure.

FIG. 2 is a flow diagram illustrating steps performed in a laser patterning method 200, in accordance with one or more embodiments of the present disclosure. Applicant notes that the embodiments and enabling technologies described in the context of the system 100 should be interpreted to extend to the laser patterning method 200. It is further noted, however, that the laser patterning method 200 is not limited to the architecture of the system 100.

In some embodiments, the laser patterning method 200 includes a step 202 of fabricating one or more precursor sites 104 on a sample 106. The layout of the precursor sites 104 on the sample 106 may be referred to as a precursor pattern. In some embodiments, the laser patterning method 200 includes a step 204 of scanning an illumination beam 110 across the sample 106 along a scan pattern including locations of at least some of the one or more precursor sites 104 to selectively excite the precursor sites 104 and selectively modify the sample 106 at the locations of the precursor sites 104.

The sample 106 may include any type of sample known in the art including, but not limited to, a glass, a semiconductor, or a metal. Further, a precursor site 104 may include any type of material modification of the sample 106 known in the art that may be selectively excited by a burst of laser pulses (e.g., a pulse burst) including, but not limited to, a defect site, a dopant, a color center, or a self-trapped exciton (STE). In a general sense, a precursor site may include any type of site that provides an intermediate excitation state into which carriers may be selectively excited by a burst of laser pulses without inducing modification of surrounding material in the sample 106.

A precursor site 104 generated in step 202 may have any selected size or pattern. For example, a precursor site 104 may be shaped as a circle, a line, an arc, or any arbitrary shape. In some embodiments, a precursor site 104 has at least one dimension smaller than a size of the illumination beam 110 on the sample 106. In some embodiments, a precursor site 104 may have at least one dimension on the order of nanometers or lower. For example, a precursor site 104 may have, but is not limited to, a dimension on the order of 100 nm, 50 nm, 1 nm, or lower. Further, a precursor site 104 may be located on a surface of the sample 106 or within a volume of the sample 106 (e.g., below the surface of the sample 106).

The precursor fabrication sub-system 102 may include one or more components suitable for fabricating one or more precursor sites 104. Further, the precursor sites 104 may be formed using any technique or combination of techniques known in the art.

In some embodiments, a precursor site 104 is generated using a direct writing technique. For example, the precursor fabrication sub-system 102 may include a source configured to generate a beam suitable for generating a precursor site 104 (e.g., a precursor generation beam). In some instances, the precursor generation beam is a laser beam, which may have any temporal profile (e.g., pulsed or continuous-wave (CW)) and any spectrum suitable for generating a precursor site 104. As an illustration, the precursor fabrication sub-system 102 may include a laser source to generate an ultrashort pulsed precursor generation beam with a pulse duration on the order of picoseconds, femtoseconds, or attoseconds. Non-limiting examples of precursor sites 104 that may be generated using such techniques include, but are not limited to, damage, color center formation, refractive index changes, or the formation of surface structures. In some instances, the precursor generation beam is a particle beam such as, but not limited to, an electron beam (e.g., an e-beam), an ion beam, or a neutral particle beam. Non-limiting examples of precursor sites 104 that may be generated using such techniques include, but are not limited to, damage, ion implantation, or the formation of surface structures.

A precursor fabrication sub-system 102 suitable for precursor generation via a direct writing technique may include various components to scan the precursor generation beam across the sample 106 (or equivalently translate the sample 106 with respect to the precursor generation beam). Further, a precursor fabrication sub-system 102 suitable for precursor generation via a direct writing technique may include various components to modify properties of the precursor generation beam such as, but not limited to, lenses (or other focusing elements), mirrors, polarizers, filters, or the like. Such components may thus control properties of the precursor generation beam such as, but not limited to, intensity, beam size (e.g., focused beam size on the sample 106), beam shape, spectrum, or polarization.

In some embodiments, a precursor site 104 may be generated using a lithographic technique. For example, a precursor site 104 may be generated by exposing a sample 106 with an image of a reticle or photomask having the desired precursor pattern (e.g., projecting the image onto the sample 106). As an illustration, low-wavelength light such as, but not limited to, ultraviolet (UV) light, extreme ultraviolet light (EUV), x-rays, or the like may be suitable for forming precursor sites 104 on the sample 106. By way of another example, a precursor site 104 may be generated by depositing a photoresist on the sample 106, exposing and developing the photoresist to form apertures in the photoresist corresponding to the precursor pattern by exposing the sample 106 to light (e.g., low-wavelength light as described above), and removing the photoresist from the sample prior to scanning the illumination beam 110.

Further, the step 204 of scanning an illumination beam 110 across the sample 106 along a scan pattern including locations of at least some of the one or more precursor sites 104 to selectively excite the precursor sites 104 and selectively modify the sample 106 at the locations of the precursor sites 104 may be implanted in various ways within the spirit and scope of the present disclosure. In some embodiments, the sample 106 is scanned with respect to the illumination beam 110 (e.g., with a translation stage). In some embodiments, the illumination beam 110 is scanned with respect to the sample 106 (e.g., with galvo mirrors, or the like). In some embodiments, different laser pulses in a pulse burst are directed to the sample 106 in a partially-overlapping pattern. For example, the laser pulses in a pulse burst may not be fully collinear, but may rather have a selected spatial distribution. In some cases, successive laser pulses partially overlap such that the In a general sense, the spatial and temporal characteristics of the pulses within the illumination beam 110 (e.g., within pulse bursts of the illumination beam 110) are tailored or otherwise selected to provide selective excitation of the precursor sites 104 without excitation of surrounding portions of the sample 106. As a result, the sample 106 may be modified (e.g., patterned) at the locations of the precursor sites 104 to form patterned features 112. For example, the illumination beam 110 may include one or more pulse bursts, where each pulse burst includes two or more laser pulses. In this configuration, parameters such as, but not limited to the intensity of each laser pulse, temporal inter-pulse spacings ($\Delta t$), and/or the spatial position on the sample 106 of each laser pulse may be controlled to selectively excite the precursor sites 104 to the point of inducing permanent patterned features 112 without exciting the surrounding material to this point.

It is contemplated herein that the scan pattern may generally have any pattern that covers the precursor pattern. In particular, it is contemplated herein that the patterned features 112 may be formed at the locations of the precursor sites 104 regardless of the scan pattern used since the material modifications associated with the patterned features 112 are associated with selective excitation of the precursor sites 104. For example, the intensity of each of the laser pulses in the illumination beam 110 may be selected to be below a known modification threshold. However, the pulse bursts may be tailored to selectively excite the precursor sites 104 when illuminated by a pulse burst. For example, each laser pulse may selectively excite carriers within the precursor sites 104 and the inter-pulse spacing between the pulses within a pulse burst may be shorter than the lifetimes of these pulses. As a result, the carriers may be successively excited by the series of laser pulses within the pulse burst until a critical density of excited carriers exceeding the material modification threshold of the sample 106 is reached in the locations associated with the precursor sites 104.

It is further contemplated herein that the resulting patterned features 112 may be associated with any material change of the sample 106 such as, but not limited to, material modification (e.g., structural modification) or material damage. Further, since the material modification is localized to the precursor sites 104, a resulting feature pattern (e.g., distribution of patterned features 112) may be based on the precursor pattern (e.g., distribution of precursor sites 104). In some embodiments, patterned features 112 are the same size as the associated precursor sites 104, which may be substantially smaller than a beam size of the illumination beam 110 on the sample 106. In some cases, the patterned features 112 may be on the order of nanometers or smaller (e.g., on the order of 100 nm, 50 nm, 1 nm, or lower). In some embodiments, patterned features 112 are larger than the corresponding precursor sites 104 (e.g., due to diffusion in the sample 106), but still smaller than the beam size of the illumination beam 110.

Additionally, the resulting patterned features 112 may be on the surface of the sample 106 or within a volume of the sample 106 depending on locations of the precursor sites 104.

Referring now to FIGS. 3A-3B, various techniques for sample patterning based on scanning an illumination beam 110 across one or more precursor sites 104 are described in greater detail, in accordance with one or more embodiments of the present disclosure.

In some embodiments, the temporal and/or spatial characteristics of the laser pulses within the illumination beam 110 (e.g., within a pulse burst of the illumination beam 110) are selected to provide sizes and/or locations of patterned features 112 that precisely correspond to the sizes and/or locations of associated precursor sites 104.

FIG. 3A is an illustration depicting selective modification of a sample 106 to form patterned features 112 at locations associated with one or more precursor sites 104, in accordance with one or more embodiments of the present disclosure. Panel 302 depicts precursor sites 104 shaped as a line (e.g., fabricated in step 202).

Panel 304 depicts scanning an illumination beam 110 across the sample 106 (e.g., step 204). As shown in panel 304, the laser pulses of the illumination beam 110 (e.g., within a particular pulse burst) are configured to at least partially overlap spatially on the sample 106 during a scan such that any given location on the sample 106 is exposed to multiple laser pulses within a pulse burst. As a result, the illumination beam 110 may selectively excite the precursor sites 104 to form a patterned feature 112. Panel 306 depicts a fully-formed patterned feature 112 as a result of scanning the illumination beam 110 across the precursor sites 104 in FIG. 3A.

It is noted that the use of a dashed line in FIG. 3A to depict the precursor site 104 is intended to visually distinguish the precursor sites 104 from the patterned feature 112 and not necessarily to indicate gaps between precursor sites 104. For example, the precursor site 104 in FIG. 3A may be formed as a continuous structure or sequence of structures that are sufficiently closely spaced to form a continuous patterned feature 112 upon illumination with the illumination beam 110.

Further, as depicted in FIG. 3A, the dimensions of the patterned feature 112 (e.g., the width and length of the illustrated line) may be the same as the associated precursor sites 104 or substantially similar as limited by diffusion or other phenomena.

In some embodiments, the temporal and/or spatial characteristics of the laser pulses within the illumination beam 110 (e.g., within a pulse burst of the illumination beam 110) are selected to expand at least one precursor site 104 and further selectively modify the expanded precursor site 104.

FIG. 3B is an illustration depicting both expansion of a precursor site 104 along a selected direction as an expanded precursor site 104 and selective modification of the expanded precursor site 104, in accordance with one or more embodiments of the present disclosure. Panel 308 depicts a single precursor site 104 (or a relatively small location of concentrated precursor sites 104). Panel 310 depicts scanning an illumination beam 110 across the sample 106 (e.g., step 204). As shown in panel 310, the laser pulses of the illumination beam 110 (e.g., within a particular pulse burst) are configured to at least partially overlap spatially on the sample 106 during a scan such that any given location on the sample 106 is exposed to multiple laser pulses within a pulse burst. Further, the spatial and temporal properties of the pulses are selected to both expand the precursor site 104 along a direction of the scan (e.g., a horizontal direction here) and excite the expended precursor site 104 to form a patterned feature 112. Panel 312 depicts a fully-formed patterned feature 112 as a result of scanning the illumination beam 110.

It is contemplated herein that FIGS. 3A and 3B depict alternative techniques for forming a patterned feature 112 by scanning an illumination beam 110 over one or more precursor sites 104. Each of these techniques may have different advantages and may be suitable for different applications. For example, the technique depicted in FIG. 3A may facilitate a flexible scanning pattern of the illumination beam 110, but requires precise pre-patterning of the precursor sites 104 in the desired feature pattern. As another example, the technique depicted in FIG. 3B may facilitate on-the fly control of the patterned feature 112 from a starting position of an initial precursor site 104.

As depicted in FIGS. 3A-3B, similar patterned features 112 (here a linear patterned feature 112) may be formed using the various techniques disclosed herein.

Referring again to FIG. 1, various aspects of a laser patterning sub-system 108 suitable for generating the illumination beam 110 and/or scanning the illumination beam 110 across the sample 106 are described in greater detail, in accordance with one or more embodiments of the present disclosure.

In some embodiments, the laser patterning sub-system 108 includes a laser source 114 to generate an illumination beam 110 including one or more laser pulses. The laser source 114 may include any type of source known in the art including, but not limited to, a fiber laser source, a free-space laser source using bulk optical elements, a diode laser source, or a quantum cascade laser source.

The illumination beam 110 may have any wavelength or wavelength range suitable for patterning a desired sample 106 including, but not limited to, infrared (IR) wavelengths, visible wavelengths, UV wavelengths, EUV wavelengths, or X-ray wavelengths. The one or more pulses of the illumination beam 110 may further have any pulse duration and/or repetition rate. In some embodiments, the illumination beam 110 includes pulses with pulse durations on the order of picoseconds or lower. In this way, the pulses may interact with the precursor sites 104 on a timescale at or shorter than a lifetime of the intermediate excitation states provided by the precursor sites 104.

In some embodiments, the laser patterning sub-system 108 includes a burst generator 116 to manipulate one or more pulses from the illumination beam 110 to generate at least one pulse burst with two or more laser pulses. In a general sense, any particular pulse burst may include any number of pulses. Further, the burst generator 116 may manipulate various aspects of the constituent laser pulses within each pulse burst such as, but not limited to, the intensities, polarizations, or inter-pulse spacings. The constituent laser pulses within a pulse burst may have the same properties (e.g., intensities, polarizations, or the like) or may have different properties. Further, the inter-pulse spacings between the constituent pulses may be constant within a pulse burst or may vary. In this way, the various aspects of the pulse burst (e.g., the burst shape) may be tailored to selectively excite the precursor sites 104 to generate controlled material modification of the sample 106 that is localized to the precursor sites 104.

The burst generator 116 may include any combination of optical components suitable for manipulating one or more laser pulses from the laser source 114 into one or more pulse bursts with tailored properties. In some embodiments, the burst generator 116 includes one or more Michelson interferometers. For example, burst generator 116 may include one or more beamsplitters to split the illumination beam 110 into two or more paths having different optical delay lengths and may further include one or more beam combiners to combine light from the one or more paths to provide a modified version of the illumination beam 110 including one or more pulse bursts. In this way, the number of pulses in a pulse burst may be controlled by the number of paths and the inter-pulse spacings between the pulses may be controlled by the optical path lengths of these paths. It is noted that providing different optical delay lengths in different arms of an interferometer to produce a pulse burst may not produce an interference pattern since the pulses do not overlap in time; the term interferometer is thus used to broadly describe the associated components. Additionally, the burst generator 116 may include various additional components such as, but not limited to, polarizers, neutral density filters, spatial filters, or spectral filters within any of the paths. Accordingly, the intensity and spectral properties of each constituent pulse within a pulse burst may be separately modified. In some embodiments, the burst generator 116 includes one or more interferometers (e.g., Fabry-Perot interferometers, or the like). In some embodiments, the burst generator 116 includes one or more stacked birefringent crystals.

In some embodiments, a laser patterning sub-system 108 includes a scanning sub-system 118 to scan the illumination beam 110 with the pulse bursts along the scan pattern.

The scanning sub-system 118 may include any components suitable for creating a relative motion between the sample 106 and the illumination beam 110. In some embodiments, the scanning sub-system 118 includes one or more translation stages to secure and translate the sample 106. In some embodiments, the scanning sub-system 118 includes beam-scanning optics (e.g., galvo mirrors, or the like) to scan the illumination beam 110 across the sample 106. Further, in some embodiments, the scanning sub-system 118 may include both translation stages and beam-scanning optics.

Figure 4:
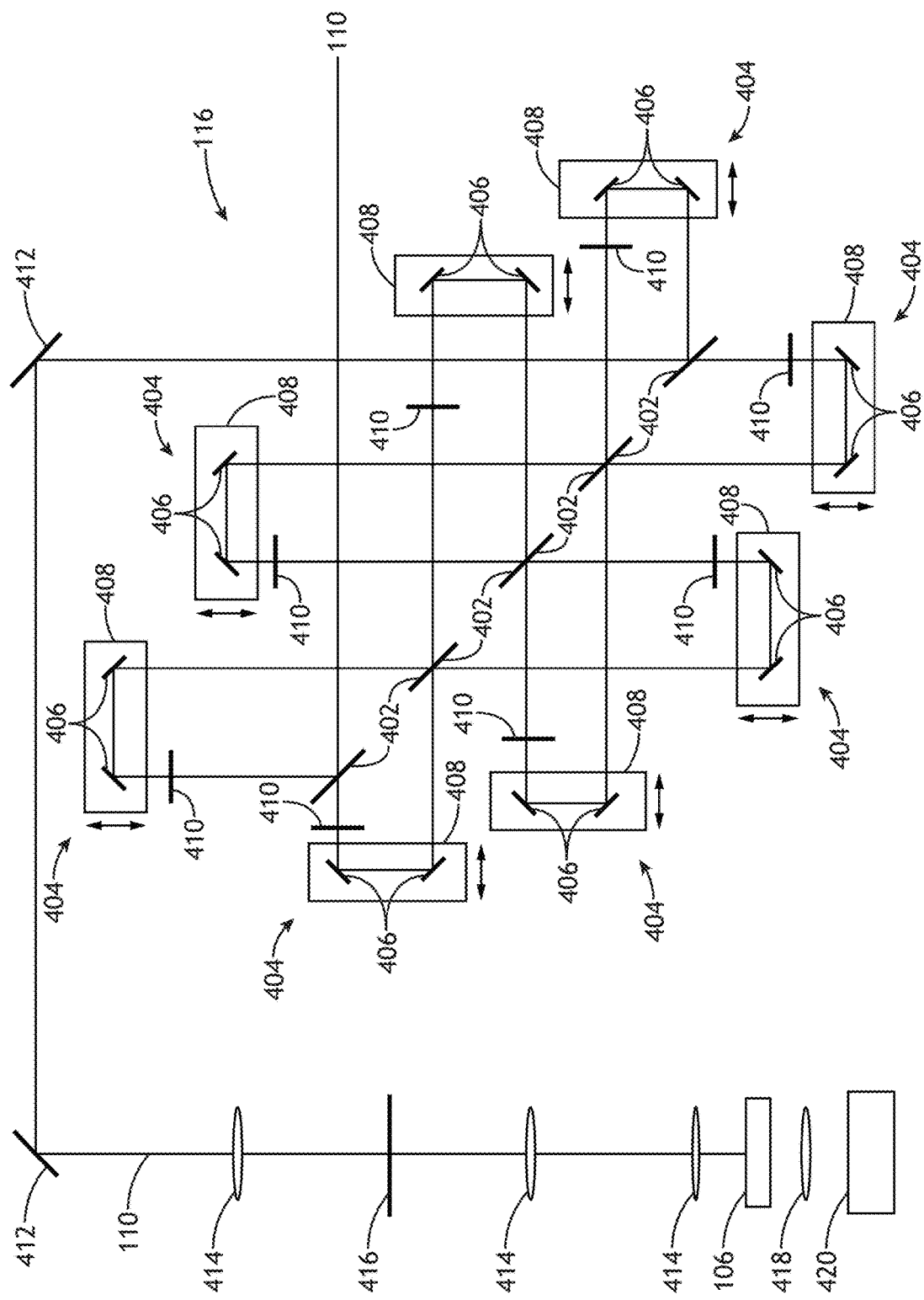
FIG. 4 is a conceptual schematic view of a portion of burst generator, in accordance with one or more embodiments of the present disclosure.
Figure 5:
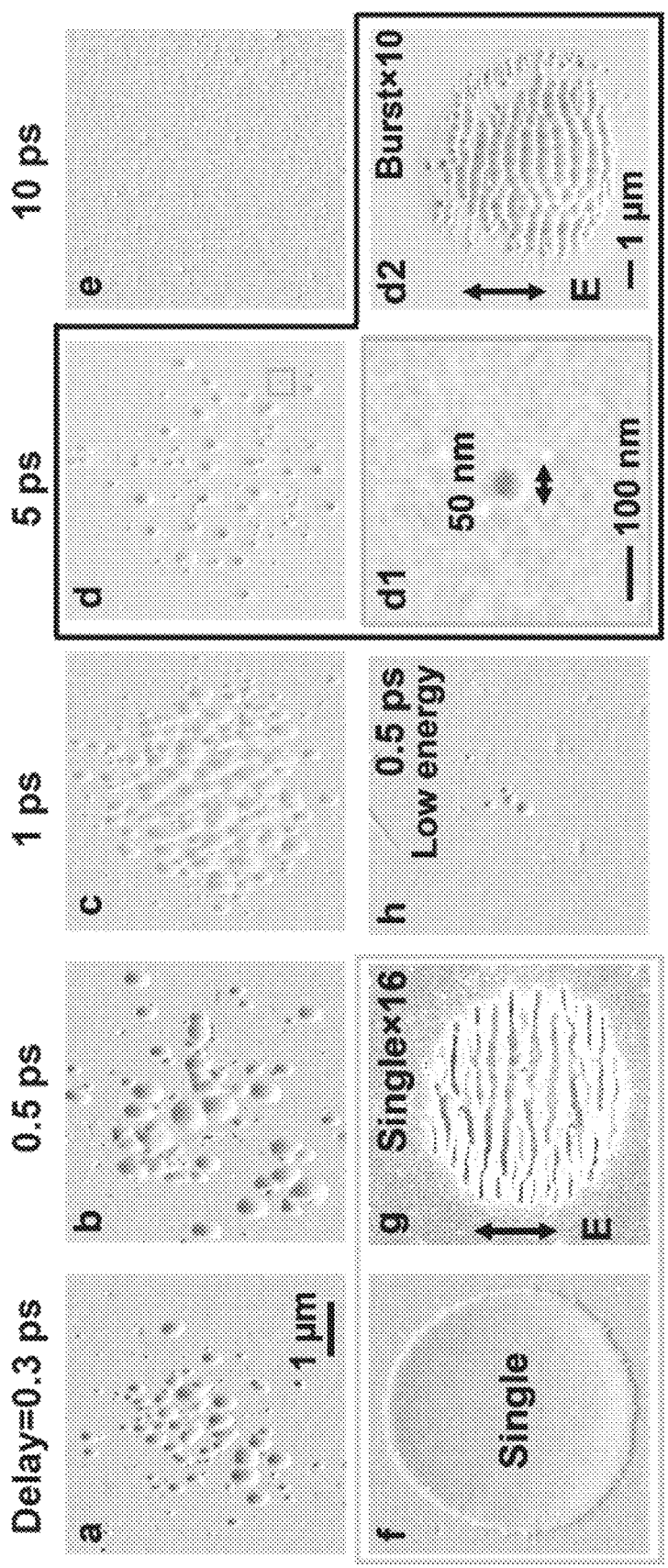
FIG. 5 illustrates scanning electron microscope (SEM) images of surface structures generated by different laser pulses, in accordance with one or more embodiments of the present disclosure.
Figure 6:
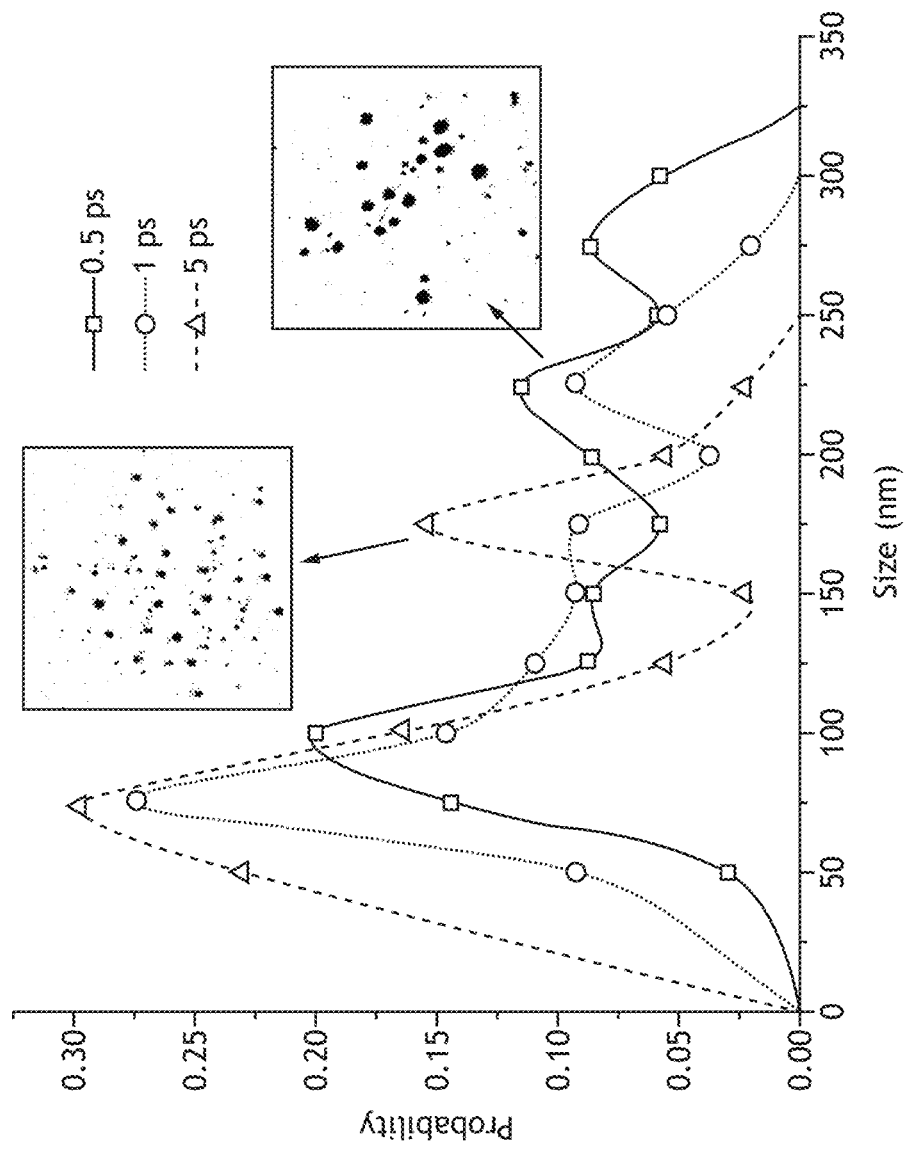
FIG. 6 is a plot showing a distribution of feature size for $\Delta t=0.5$, 1 and 5 ps, in accordance with one or more embodiments of the present disclosure.

Referring now to FIGS. 4-6, an experimental demonstration of laser patterning based on selective excitation of precursor sites 104 with pulse bursts is described in greater detail, in accordance with one or more embodiments of the present disclosure.

FIG. 4 is a conceptual schematic view of a portion of a patterning system 100, in accordance with one or more embodiments of the present disclosure. In particular, FIG. 4 illustrates a non-limiting example of a burst generator 116 formed as fourfold Michelson interferometer. For example, FIG. 4 depicts the burst generator 116 with five beamsplitters 402 to split a laser pulse along multiple arms with different path lengths and then recombine the various pulses into a pulse burst. The burst generator 116 in FIG. 4 further includes delay lines 404 formed as a pair of mirrors 406 on translation stages 408 to control the inter-pulse spacings of the laser pulses in the pulse burst. The burst generator 116 in FIG. 4 also includes neutral density filters 410 (e.g., fixed or variable neutral density filters) to control the intensity of each laser pulse in the pulse burst. FIG. 4 further depicts additional mirrors 412, lenses 414, and a spatial filter 416 (e.g., a pinhole) to direct the illumination beam 110 with the pulse burst to a sample 106 with a controlled spot size. Additionally, FIG. 4 depicts a collection lens 418 and a detector 420 to image the sample 106.

The experiments illustrated herein are conducted with a femtosecond that delivers pulses with pulse duration of 167 fs (full width at half maximum, FWHM), central wavelength of 1030 nm, and polarization perpendicular to the optical table (s-polarized). A single pulse is selected by a pulse-picker and sent to a burst generator 116 formed as a fourfold Michelson interferometer for pulse splitting. In this illustration, the burst generator 116 is configured to split a pulse of an incident illumination beam 110 into 16 replicated laser pulses separated equally in time with delay between two pulses in the range of 300 fs to 5 ps. The energy of the burst is controlled by the output transmission in the laser. The 16-pulse burst is sent to a spatial filter consisting of two lenses (L1-2) and a pinhole (diameter 75 µm) to improve spatial profile. The burst is then focused by an objective lens with 0.25 NA (numerical aperture). The focal spot size is 5 µm measured at $1/e^2$ intensity level. A fused silica sample 106 is placed at the focal plane. Four types of pulses are used to create structures on the front (facing the laser beam) surface of the sample 106 in this illustration: (i) a single pulse, (ii) a sequence of pulses at the original laser repetition frequency of 1 kHz (pulse-to-pulse delay 1 ms), (iii) a burst of 16 pulses with delays between 0.3 to 10 ps, and (iv) multiple bursts with burst-to-burst delay of 1 ms. Fresh sites on the sample 106 are used for each pulse type. A camera placed directly behind the sample 106 is used to monitor the sample position and observe laser-induced structures in situ (e.g., on the site). The sample 106 was then sputter coated with gold and examined by a scanning electron microscope (SEM).

Referring now to FIG. 5, FIG. 5 illustrates SEM images of surface structures generated by different laser pulses, in accordance with one or more embodiments of the present disclosure. The scale bar is 1 µm unless noted on the image. Insets (a-e) show pulse bursts with different delays (Δt). No structure is observed for Δt=10 ps. Burst energy (total energy of the 16 pulses) is 4, 5.2, 4, 4.5 and 5.2 µJ, respectively. Insets (f-g) show a single pulse and 16 single pulses at 1-kHz repetition rate (corresponding to Δt=1 ms). Inset (h) shows fewer pits are generated at Δt=0.5 ps with burst energy 3.5 µJ compared to (b) with 5.2 µJ. Inset (d1) shows enlarged SEM image showing pits with diameter ~50 nm. Inset (d2) shows ripple-like structures with 10 pulse bursts (total 160 pulses). Note the change of scalebar.

Different types of morphology are observed on the surface of fused silica. FIG. 5(a-c) shows typical morphology induced by pulse bursts with different delay Δt. Circular and slightly oval craters are located in random locations within the focal spot. Such morphologies are drastically different from the one induced by a single pulse (FIG. 5(f)). The locations of these craters differ from burst to burst. The number of craters depends on the total energy of the burst and can exceed 16 which is the number of pulses in a burst. This suggest that these craters do not result from individual pulses but instead forms "spontaneously", in a way similar to "ripples" also known as laser-induced periodic surface structures (LIPSS), as shown in FIG. 5(g) for comparison purposes.

Unlike ripples, the locations of these craters from a burst do not have obvious dependency on laser polarization. The shape of the craters, however, seems to be polarization-dependent. For example, some of the large craters in FIG. 5(b) are elongated along the polarization direction. This contradicts with current theories on near-field effects and plasmon effects and need to be investigated. Interestingly, when irradiated with multiple bursts (FIG. 5(d2)), there are obvious ripple-like structures formed perpendicularly to the polarization. However, the pitch of these "ripples" is about twice of ordinary ripples.

The morphology of these craters remains similar for $\Delta t$=0.3, 0.5 and 1 ps, although there seems to be an increase in crater density for $\Delta t$=1 ps with a similar burst energy. For each $\Delta t$, the crater density is found to decrease with decreasing burst energy. In some cases there are only a few craters found as shown in FIG. 4(h). Interestingly, burst energy does not significantly affect the likelihood of finding small craters (discussed next). There is an obvious change in morphology at $\Delta t$=1 ps, when the randomness seems to decrease and we will discuss in detail in the next section. No craters are found at $\Delta t$=10 ps even a high burst energy is used. This indicates that the mechanism responsible for the formation of these craters is transient on the ultrafast (~10 ps) time scale.

It is contemplated herein that the structures (e.g., craters) shown in FIG. 5(a)-(d) including (d1) and (d2) are formed in response to naturally-occurring precursor sites 104 on the sample 106. In this way, such structures may be considered patterned features 112. In particular, it is noted that such patterned features 112 are not generated using a single pulse, but are rather generated by selective excitation of the naturally-occurring precursor sites 104 and require specific inter-pulse times ($\Delta t$) associated with successive excitation of carrier states of these precursor sites 104 with a pulse burst.

Notably, many craters (e.g., the patterned features 112) have diameters below 100 nm and some of them are ~50 nm, as shown in FIG. 5(d1). Since the focal diameter of the illumination beam 110 is 5 μm in this non-limiting example, the smallest craters are only 1/100 of the spot size, which corresponds to the smallest known ratio of feature size to beam size. These small craters can be found in different sites from different pulse parameters, suggesting again that they are more likely due to material properties that serve as precursor sites 104 rather than the burst itself.

Referring now to FIG. 6, FIG. 6 includes a plot showing a distribution of feature size for $\Delta t$=0.5, 1 and 5 ps, in accordance with one or more embodiments of the present disclosure. Insets are images for $\Delta t$=0.5 and 5 ps that are used for particle counting.

One can gain some insights into the mechanism responsible for this new morphology of patterned features 112 formed by precursor sites 104 by analyzing the size distribution of the patterned features 112. FIG. 6 shows the probability of finding craters with size between 0 and 350 nm, for $\Delta t$=0.5, 1 and 5 ps. Multiple datasets are combined in some cases to increase the signal-to-noise ratio. The following observations can be made.

First, for each $\Delta t$, crater size can range from 50 nm to hundreds of nm. Due to the resolution of the SEM images, we are not able to discern craters smaller than 50 nm. The largest crater size decreases from 300 nm for $\Delta t$=0.5 ps to 225 nm for $\Delta t$=5 ps. Second, the size distributions have distinct peaks, and the number of peaks decreases with larger $\Delta t$. For $\Delta t$=5 ps, the distribution has a bimodal shape that peaks at 75 and 175 nm. Third, the curves shown in FIG. 6 appear to move to the left (smaller size) as $\Delta t$ increases.

Based on these observations, the formation of the craters (e.g., patterned features 112) is due to precursor sites 104 located on the surface or slightly below the surface that provide additional absorption bands with carrier lifetime longer than the conduction-valence band transition (~60 fs). Such precursor sites 104 can be pre-existing defects such as color centers or can be induced by the first few pulses of the burst in the form of self-trapped excitons (STEs). Given the fact that $\Delta t$=10 ps bursts have a much lower likelihood of generating craters, the STE mechanism is likely in this non-limiting example. This is further supported by the bimodal size distribution at $\Delta t$=5 ps, which is consistent with the two STE lifetimes.

It is contemplated herein that the smallest observed crater size of ~50 nm in this illustration may be associated with a diffusion limit of laser ablation in the particular sample 106 (here, fused silica). This number is similar to the lower limit of laser-induced structures reported by different groups using different techniques. In the case that the craters shown in this illustration are initiated by point defects, then the diffusion coefficient D required for excited free carriers to reach 50 nm in size for the $\Delta t$=5 and 0.3 ps bursts is between 0.3 and 5 cm$^2$/s. This D is consistent with the 2.5 cm$^2$/s value reported for bulk silicon. Therefore, this illustration may demonstrate that the minimum feature size is limited by the diffusion limit of laser ablation.

Referring now generally to FIGS. 4-6, a new type of morphology of patterned features 112 on the surface of fused silica that consists of craters with size ranging from 50 to 350 nm is illustrated using ultrashort pulse bursts with pulse-to-pulse delay $\Delta t$ between 0.3 to 5 ps. These craters appear in random locations within a spot size of 5 μm associated with randomly-located precursor sites 104, and their size distribution can be controlled by tuning $\Delta t$.

It is to be understood that FIGS. 4-6 and the associated descriptions are provided solely for illustrative purposes and should not be interpreted as limiting. For example, FIGS. 4-6 and the associated descriptions depict illustrative experiments on the formation of nano-scale features using random precursor sites 104 present on the surface of the sample 106. However, as described herein, it is contemplated that this technique may be extended to provide features having any desired feature pattern (e.g., distribution of patterned features 112) by intentionally fabricating precursor sites 104 in a corresponding precursor pattern.

Figure 7:
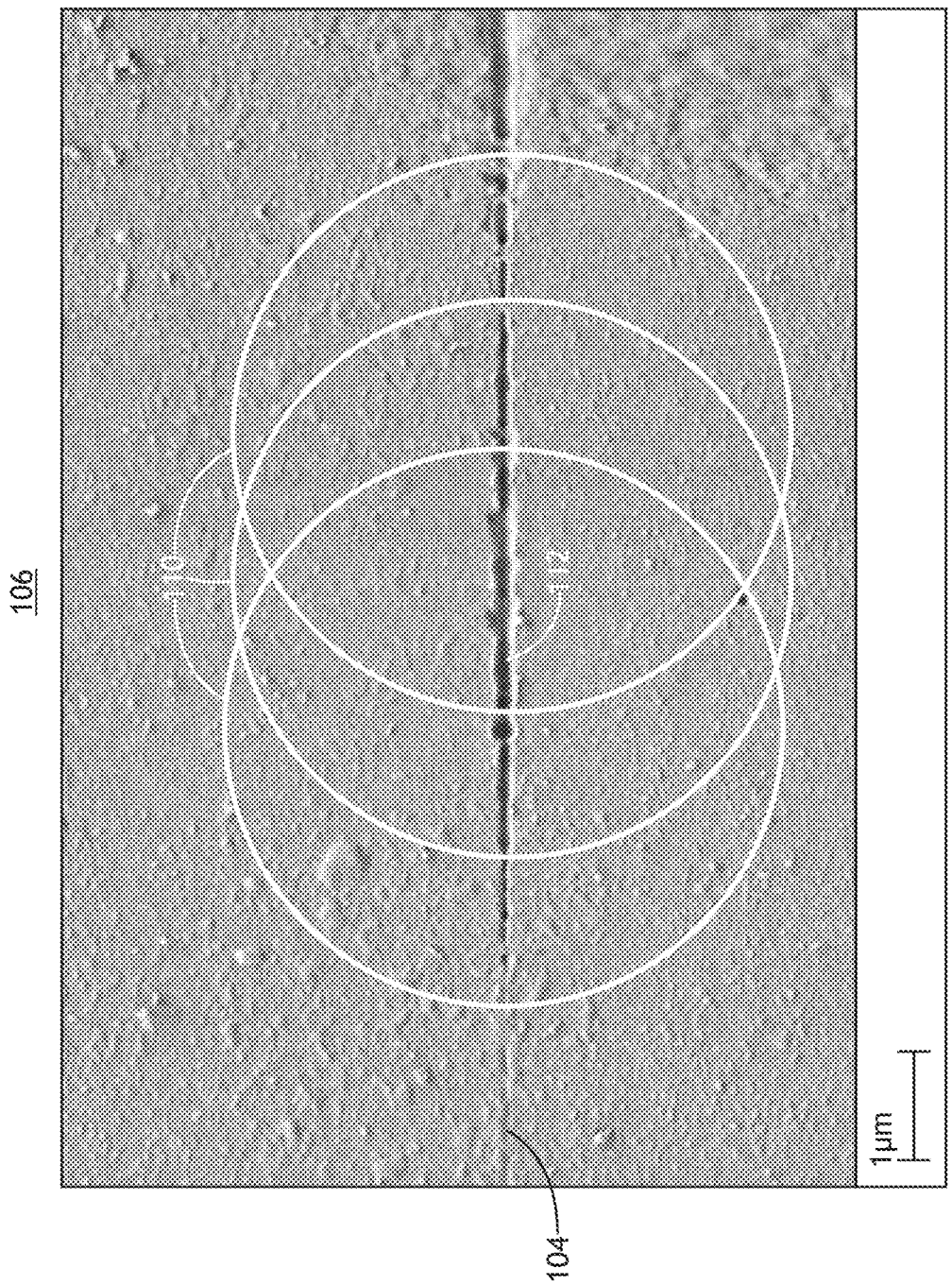
FIG. 7 is a scanning electron microscope (SEM) image of a linear patterned feature fabricated using the technique illustrated in FIG. 3A, in accordance with one or more embodiments of the present disclosure.

Referring now to FIG. 7, FIG. 7 is a scanning electron microscope (SEM) image of a linear patterned feature 112 fabricated using the technique illustrated in FIG. 3A, in accordance with one or more embodiments of the present disclosure. In this illustration, a linear precursor site 104 was formed using a focused ion beam (FIB). FIG. 7 also depicts outlines illustrating the approximate size and distribution of laser pulses in a pulse burst of the illumination beam 110 during a scan. In FIG. 7, a portion of the precursor site 104 not illuminated with the illumination beam 110 is visible. However, it is to be understood that the precursor sites 104 need not be visible prior to generation of the patterned features 112. In some embodiments, the precursor sites 104 are not visible. Further, the patterned feature 112 (here an ablated feature) has a width that is substantially smaller than the focused size of the laser pulses of the illumination beam 110 and is approximately the width of the precursor site 104, which illustrates the formation of the patterned feature 112 through selective excitation of the precursor site 104 with the overlapping laser pulses of the illumination beam 110 without modification of the surrounding portions of the sample 106.

Referring generally to FIGS. 3A-7, it is to be understood that the description of the particular sample 106, illumination beam 110, burst generator 116, and associated pulse burst characteristics are provided solely for illustration and should not be interpreted as limiting. Rather, the systems and methods disclosed herein may be extended to any type of sample 106, where the appropriate properties of the pulse bursts may vary based on the composition of the sample 106 and the type of precursor sites 104 used in the fabrication process.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A laser patterning method comprising:
   fabricating one or more precursor sites on a sample;
   generating an illumination beam including one or more pulse bursts, each pulse burst including two or more laser pulses; and
   scanning the illumination beam across the sample along a scan pattern including locations of the one or more precursor sites, wherein at least one of intensities, temporal inter-pulse spacings, or spatial overlap between the two or more laser pulses in the illumination beam are selected to selectively excite the one or more precursor sites to selectively modify the sample at the one or more precursor sites to form one or more patterned features, wherein a dimension of at least one feature in the one or more patterned features along at least one dimension is smaller than a size of the illumination beam on the sample.

2. The laser patterning method of claim 1, wherein the one or more precursor sites form a precursor pattern on the sample, wherein dimensions of the one or more patterned features correspond to dimensions of the precursor pattern.

3. The laser patterning method of claim 1, wherein at least one of the intensities, the temporal inter-pulse spacings, or the spatial overlap between the two or more laser pulses in the illumination beam are further configured to expand at least one of the one or more precursor sites along at least a portion of the scan pattern to form at least one expanded precursor site and to selectively excite the at least one expanded precursor site to selectively modify the sample at the at least one expanded precursor site, wherein the one or more patterned features further include the at least one expanded precursor site.

4. The laser patterning method of claim 1, wherein fabricating the one or more precursor sites on the sample comprises:
   scanning a laser beam across the sample to form the one or more precursor sites using a direct write process.

5. The laser patterning method of claim 4, wherein the laser beam comprises:
   a pulsed laser beam.

6. The laser patterning method of claim 1, wherein fabricating the one or more precursor sites on the sample comprises:
   scanning at least one of an electron beam, an ion beam, or a neutral particle beam across the sample to form the one or more precursor sites using a direct write process.

7. The laser patterning method of claim 1, wherein fabricating the one or more precursor sites on the sample comprises:
   projecting an image of the one or more precursor sites onto the sample.

8. The laser patterning method of claim 1, wherein fabricating the one or more precursor sites on the sample comprises:
   fabricating a photoresist on the sample, wherein the photoresist includes features associated with the one or more precursor sites; and
   illuminating the photoresist on the sample to form the one or more precursor sites.

9. The laser patterning method of claim 8, further comprising:
   removing the photoresist from the sample prior to scanning the illumination beam across the sample along the scan pattern.

10. The laser patterning method of claim 1, wherein a dimension of the one or more patterned features along at least one dimension is smaller than 1 micrometer.

11. The laser patterning method of claim 1, wherein a dimension of the one or more patterned features along at least one dimension is smaller than or equal to 100 nanometers.

12. The laser patterning method of claim 1, wherein at least some of the two or more laser pulses in the illumination beam have pulse durations shorter than 1 nanosecond.

13. The laser patterning method of claim 1, wherein a number of pulses in at least one of the one or more pulse bursts is greater than two.

14. The laser patterning method of claim 1, wherein a number of pulses in at least one of the one or more pulse bursts is greater than 10.

15. The laser patterning method of claim 1, wherein a number of pulses in at least one of the one or more pulse bursts is 16.

16. The laser patterning method of claim 1, wherein the temporal inter-pulse spacings of at least some of the two or more laser pulses in at least some of the one or more pulse bursts are in a range from 100 femtoseconds to 100 picoseconds.

17. The laser patterning method of claim 1, wherein the temporal inter-pulse spacings of at least some of the two or more laser pulses in at least some of the one or more pulse bursts are in a range from 300 femtoseconds to 5 picoseconds.

18. The laser patterning method of claim 1, wherein the one or more precursor sites comprise at least one of defect sites, color centers, or self-trapped excitons.

19. A laser patterning system comprising:
a laser source configured to generate one or more input laser pulses;
a burst generator including one or more optical elements to generate an illumination beam including one or more pulse bursts from at least one of the one or more input laser pulses from the laser source, wherein each pulse burst includes two or more laser pulses; and
a scanning system to induce a relative motion between the illumination beam and a sample to provide a scan pattern of the illumination beam across the sample, wherein the sample includes one or more precursor sites, wherein the scan pattern covers the one or more precursor sites;
wherein at least one of intensities, temporal inter-pulse spacings, or spatial overlap between the two or more laser pulses in the illumination beam from the burst generator and the scanning system are selected to selectively excite the one or more precursor sites to selectively modify the sample at the one or more precursor sites to form one or more patterned features, wherein a dimension of at least one feature in the one or more patterned features along at least one dimension is smaller than a size of the illumination beam on the sample.

20. The laser patterning system of claim 19, wherein the one or more precursor sites form a precursor pattern on the sample, wherein dimensions of the one or more patterned features correspond to dimensions of the precursor pattern.

21. The laser patterning system of claim 19, wherein at least one of the intensities, the temporal inter-pulse spacings, or the spatial overlap between the two or more laser pulses in the illumination beam from the burst generator and the scanning system are further configured to expand at least one of the one or more precursor sites along at least a portion of the scan pattern to form at least one expanded precursor site and to selectively excite the at least one expanded precursor site to selectively modify the sample at the at least one expanded precursor site, wherein the one or more patterned features further includes the at least one expanded precursor site.

22. The laser patterning system of claim 19, wherein the dimension of the one or more patterned features along the at least one dimension is smaller than 1 micrometer.

23. The laser patterning system of claim 19, wherein the dimension of the one or more patterned features along the at least one dimension is smaller than or equal to 100 nanometers.

24. The laser patterning system of claim 19, wherein at least some of the two or more laser pulses in the illumination beam have pulse durations shorter than 1 nanosecond.

25. The laser patterning system of claim 19, wherein a number of pulses in at least one of the one or more pulse bursts is greater than two.

26. The laser patterning system of claim 19, wherein a number of pulses in at least one of the one or more pulse bursts is greater than 10.

27. The laser patterning system of claim 19, wherein a number of pulses in at least one of the one or more pulse bursts is 16.

28. The laser patterning system of claim 19, wherein the burst generator comprises:
at least one of one or more Michelson interferometers, one or more Fabry-Perot interferometers, or one or more stacked birefringent crystals.

29. The laser patterning system of claim 19, wherein the temporal inter-pulse spacings of at least some of the two or more laser pulses in at least some of the one or more pulse bursts are in a range from 100 femtoseconds to 100 picoseconds.

30. The laser patterning system of claim 19, wherein the temporal inter-pulse spacings of at least some of the two or more laser pulses in at least some of the one or more pulse bursts are in a range from 300 femtoseconds to 5 picoseconds.

31. The laser patterning system of claim 19, wherein the one or more precursor sites comprise at least one of defect sites, color centers, or self-trapped excitons.

* * * * *